United States Patent [19]

Sandhu

[11] 4,412,724
[45] Nov. 1, 1983

[54] STRIATING LIQUID CRYSTAL DISPLAY SUBSTRATES WITH ULTRASONICALLY CAVITATING BUBBLE BEAMS

[75] Inventor: Jaswinder S. Sandhu, Chicago, Ill.

[73] Assignee: RAJ Technology Partnership, Chicago, Ill.

[21] Appl. No.: 248,869

[22] Filed: Mar. 30, 1981

[51] Int. Cl.³ .......................... G02F 1/13; G02F 1/137
[52] U.S. Cl. ....................................................... 350/341
[58] Field of Search ................ 350/341, 350 R, 350 S, 350/349, 330, 331 R, 340

[56] References Cited

U.S. PATENT DOCUMENTS

| | | | |
|---|---|---|---|
| 3,787,110 | 1/1974 | Berreman et al. | 350/341 |
| 3,821,720 | 6/1978 | Gruebel et al. | 350/35 R X |
| 3,912,369 | 10/1975 | Kashnow | 350/341 X |
| 4,012,118 | 3/1977 | Becker et al. | 350/346 |

OTHER PUBLICATIONS

Flanders et al., "Alignment of Liquid Crystals using Submicrometer Periodicity Gratings", *Appl. Phys. & Ltt.*, vol. 32, No. 10 Mass., May 15, 1978, pp. 597–598.

Priestly et al., *Introduction to Liquid Crystals*, Plenum Pub. Corp., New York.

*Primary Examiner*—John K. Corbin
*Assistant Examiner*—David Lewis
*Attorney, Agent, or Firm*—Gerald S. Geren

[57] ABSTRACT

There is disclosed herein a method for producing a liquid crystal display or cell which has a liquid crystal film positioned between a pair of substrate members whose surfaces have been ultrasonically surface treated so as to cause the liquid crystal molecules to be aligned in a predetermined manner.

The method includes ultrasonically treating the surface of the substrate which contacts the liquid crystal film so as to form microgrooves or striations. The surface is treated by immersing the substrate in a liquid bath, ultrasonically forming a column of cavitation bubbles which is directed to the substrate where the cavitation bubbles collapse on the substrate, and moving the substrate through the liquid at a predetermined speed so as to form microgrooves or striate the surface of the substrate. Using two such treated substrates, a liquid crystal cell is prepared in the form of a sandwich of substrate/liquid crystal/substrate.

5 Claims, 5 Drawing Figures

FIG. 4
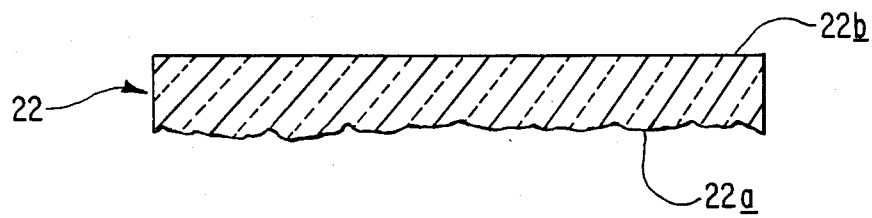
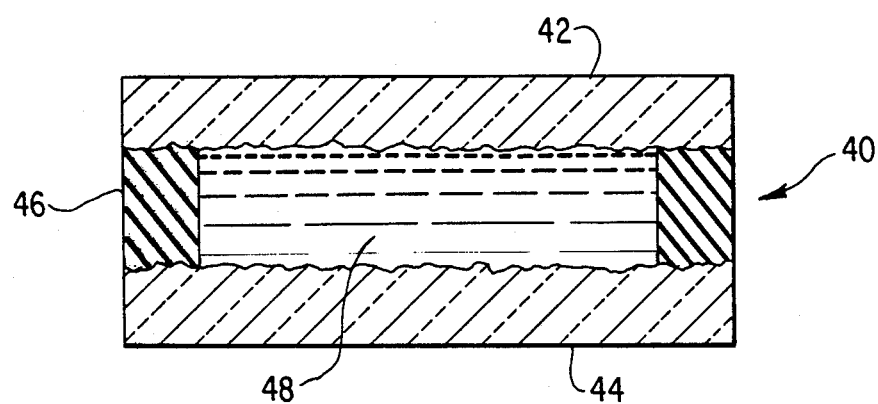
FIG. 5

STRIATING LIQUID CRYSTAL DISPLAY SUBSTRATES WITH ULTRASONICALLY CAVITATING BUBBLE BEAMS

BACKGROUND OF THE INVENTION

There is disclosed herein a novel method for aligning liquid crystal molecules for use in liquid crystal displays.

Liquid crystal materials and liquid crystal displays are well known. In a publication by E. Merck of Darmstadt, West Germany, entitled "Licristal", the state of liquid crystal technology is discussed. The publication carries an identifying number of 21/II-23/491/3.5/372. Other references on liquid crystal materials are available, such as deGennes, *Physics of Liquid Crystals*, Oxford University Press, 1974, and S. Chandrasekar, *Liquid Crystals*, Cambridge University Press, 1978.

There are three basic types of liquid crystals, namely, smectic, nematic and cholesteric. The principal differences between the types of crystals are in the molecular arrangements.

As can be appreciated, the physical properties of the liquid crystals will vary between types. Furthermore, this variation may make one type more or less desirable for different applications.

Liquid crystal displays using various types of liquid crystals are at a fairly advanced state. For example, products such as LCD wristwatches and LCD calculators are commercially available. In order to make a display, the liquid crystal is usually held in a sealed envelope between two substrates, at least one of which is optically transparent. The substrates are usually glass.

The surface of the substrates which are to contact the liquid crystal are treated before the display is assembled in order to obtain the desired alignment of the liquid crystal molecules for the particular type of display and to maximize the contrast ratio.

Presently there are two principal types of surface treatments. They include (a) applying various materials on the surface with which the liquid crystal molecule will interact or (b) mechanically abrading the surface so that the molecule interacts with the surface formation. For example, lecithin may be deposited in order to obtain homeotropic alignment or organics may be deposited by rubbing with a tissue to obtain homogenous alignment.

The other technique is to physically treat the surface to form microgrooves or striations. This can be done by abrading or cutting, rubbing with a diamond paste, or vacuum depositing siicon monoxide using the Jannings technique. See Priestly, et al., *Introduction to Liquid Crystals*, Plenim Pub. Corp., New York; Ch. 12, "Liquid-Crystal Displays—Packaging and Surface Treatments", L. A. Goodman, 1976; and A. R. Kmetz and F. K. von Willisen, *Nonemissive Electro-Optical Displays*, Plenim Pub. Corp., 1976, New York.

Using these techniques, homogenous and twisted structures can be obtained with nematic liquid crystals. In the homogenous structure the substrates are arranged so that when the cell is assembled, the striations and the molecules are parallel and aligned in a single direction. In other words, the substrate striations are parallel to one another and the molecules of the liquid crystals therebetween are macroscopically speaking, or on an average, parallel in the same direction.

In the twisted structure, the liquid crystal display is assembled with the striations on each of the two substrates being aligned in the same direction. However, one substrates may then be rotated, by usually less than 90° (perhaps between 80° and 90°) relative to the other substrate, thereby causing the liquid crystal molecules to assume a helical shape or twisted nematic.

Twisted nematics may also be formed by initially placing the substrates so that the striations are transverse to each other. Then when the cell is filled, the liquid crystal molecules will assume the helical configuration. This process eliminates the need to rotate the substrates in order to obtain the alignment.

In the twisted nematic, the molecules are angularly displaced relative to each other in such a manner that the angular displacement varies continuously from the surface of one substrate to the surface of the other substrate. This is the twisted nematic widely used in LCD displays of many kinds, such as watches, calculators, multiplexed displays, alpha-numerics, etc.

It has been determined that the existing methods for treating the substrates each has drawbacks relating to cost and ease of handling. For example, rubbing with a tissue may leave an undesirable residue and may cause chipping at the edges of the substrates which result in undesirable scoring of the substrate; diamond paste cutting may be expensive and leave an undesirable residue that may interact with the liquid crystal molecule. The process of vacuum depositing a silicon oxide (SiO) surface film has the disadvantage of requiring large, elaborate and expensive equipment as well as a long set-up time.

It is therefore the object of this invention to provide an improved technique for surface treating the substrates used in liquid crystal displays or cells for assuring directional alignment of the liquid crystal molecules.

These and other objects of this invention will become apparent from the following description and the appended claims.

SUMMARY OF THE INVENTION

There is provided by this invention an ultrasonic technique for treating the surface of substrates to be used in liquid crystal displays, such as electro-optical, acousto-optical, magneto-optical and thermo-optical, etc.

In this method an ultrasonic transducer is positioned in a liquid medium and cavitates the liquid so as to form cavitation bubbles. The bubbles may be shaped to form a column or beam. The substrate to be treated is also positioned in the medium, is exposed to the beam, and is moved through the beam.

The cavitation bubbles strike and collapse on the substrate surface forming small cavities therein. As the substrate is moved through the beam, microgrooves are formed in the surface, thus forming striations in the direction of substrate movement. High power ultrasonic cavitation is well known in industry, for such applications as cleaning of surfaces, etc.

Substrates which are treated in this manner may be successfully employed in preparing liquid crystal displays or cells where the liquid crystal molecules are in either homogenous or twisted alignment. Other liquid crystals, such as cholesterics, smectics or nematic-cholesteric mixtures can be used where there exists the need to provide a predetermined alignment for such materials.

This surface treatment assures a high contrast ratio between excited and unexcited areas of the display or cell.

BRIEF DESCRIPTION OF THE DRAWINGS

FIG. 4 is an enlarged sectional view taken along line 4—4 of FIG. 2 and showing in section the microgrooves or striations; and FIG. 5 is a sectional view showing a cell constructed with surface treated substrates and the liquid crystal molecule being in homogenous alignment.

DESCRIPTION OF THE PREFERRED EMBODIMENT

Figure 1:
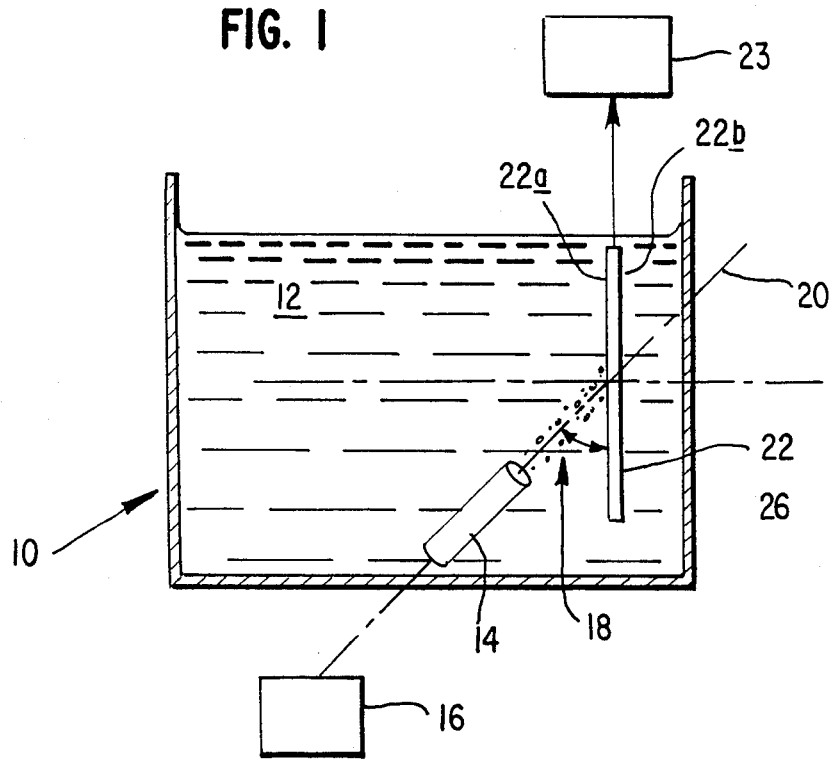
FIG. 1 is a diagrammatic view showing the ultrasonic transducer positioned for treating the substrate.

Referring now to FIG. 1, there is shown a bath 10 generally, which is filled with a liquid medium 12, which is usually water. An ultrasonic transducer 14 is positioned in the bath and is powered from an external source 16.

The ultrasonic transducer 14 cavitates the water, whereupon a column or beam of cavitation bubbles 18 is formed that move along an axis 20 generally. The beam may be shaped to assure movement of the bubbles 18 in an direction generally toward the substrate to be treated.

The substrate 22, which is usually glass and transparent, is positioned in the bath 10 so as to pass through the beam. The substrate is moved vertically through the beam 18 by a motor 23. The speed at which the substrate can be moved is variable, but a constant speed is believed preferable.

The beam forms an angle 26 relative to the plane of the substrate, and the angle 26 can also be varied so as to achieve different effects.

When the cavitation bubbles strike the substrate surface, they collapse and erode the surface of the substrate, thereby changing the surface characteristics where the bubbles strike. By moving the substrate through the beam 18, microgrooves or striations can be formed in the surface and the surface can be said to have been directionalized in the direction of movement of the substrate (i.e., a kind of rubbing action takes place). Thus the surface 22a is directionalized, whereas the surface 22b is not directionalized. This directionalization may take the form of striations along the length of the substrate and in the direction of movement.

The substrate is moved at a constant speed so as to assure uniform directionalization. Of course various different speeds could be used, and non-uniform speeds can be used if some unique property is desired.

Referring again to FIG. 2, a pair of substrates 22 and 24 are shown. The surfaces 22a and 24a which face each other have been surface treated and directionalized by this ultrasonic technique. The direction of treatment is shown by the large arrows on the substrates.

A nematic liquid crystal material 28 is positioned between the substrates 22 and 24, and due to the directionalization of the surfaces 22a and 24a, the molecules align themselves in what is referred to as a homogenous alignment. In the homogenous alignment, the molecules are arranged parallel to the direction of treatment or striations in the substrates 22 and 24. It is believed that this alignment may result from the molecules adjacent the surfaces 22a and 24a, aligning themselves with the striations. The molecules therebetween then align themselves relative to each other.

Figure 3:
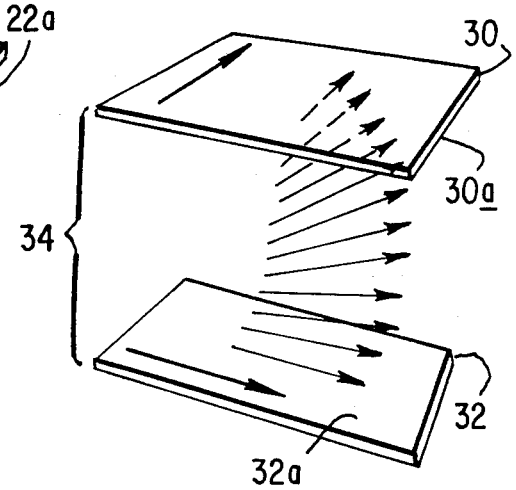
FIG. 3 is a diagrammatic perspective view intended to represent a twisted nematic or helical type of liquid display.

Referring now to FIG. 3, a twisted nematic structure is shown. In the twisted nematic structure, there are provided two directionally treated substrates 30 and 32, each having treated surfaces 30a and 32a, respectively. A nematic liquid crystal film 34 is positioned between the two substrates.

Figure 2:
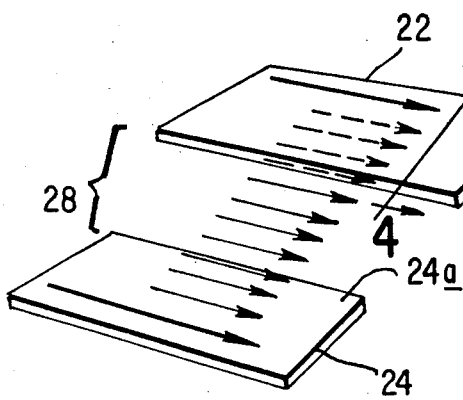
FIG. 2 is a diagrammatic perspective view intended to represent a liquid crystal display with the surface striations and liquid crystal molecules in parallel homogenous alignment.

The two substrates may be initially positioned with the striations running in the same direction, as in the homogenous structure shown in FIG. 2. Thereafter, one substrate, such as 30, is rotated by and angle $\theta$ (usually slightly less than 90°) relative to the second substrate 32. By so doing, the directions of the striations of the two substrates, while lying in parallel planes, are almost transverse to one another.

The twisted nematic may also be formed by preparing the cell with the substrate striations running substantially transverse to each other and then vacuum filling the cell with the liquid crystal material. This technique avoids the problems of rotating one substrate relative to the other. Within a short time after the cell is filled, the molecules assume the twisted nematic configuration.

The liquid crystal molecules in the film 34 form a twisted or helical structure. In a sense, this helical structure may be thought of as a spiral staircase in which each step is angularly displaced relative to adjacent steps as the staircase rises. In other words, in each successive molecular layer, beginning with the substrate surface 32a and extending to surface 30a, the molecules are angularly displaced relative to the adjacent layer so as to form an apparent helix. This is the wellknown twisted nematic case. The angular positioning of the substrate striations is adjusted to maintain a uniform helical bias or handedness on the molecules before and after subsequent excitation so that after excitation, the molecules return to their original—not a reversed—position.

Proper alignment of the molecules is important to assure a high contrast ratio between excited and unexcited areas of the cell when in use. Lack of alignment or random alignment reduces the contrast ratio. It is theorized that alignment results from elongated liquid crystal molecules resting in the microgrooves. Once the layer adjacent the substrate is aligned, the remaining molecules align therewith.

A typical display or cell, as shown in FIG. 5, includes upper and lower treated substrates 42 and 44, at least one of which is optically transparent, a spacer and sealing member 46, and the liquid crystal material 48. Such cells are usually vacuum filled as described above.

The previous discussion related to the use and alignment of nematic-type liquid crystals. However, displays using other types of liquid crystals also require alignment. Specifically, cholesteric, smectic and mixtures of cholesteric-nematic liquid crystals must be aligned. The necessary alignment can be provided using the ultrasonic surface treatment described above. For example, a cholesteric can be aligned with its helical axis parallel or perpendicular to the cell substrate, Either alignment can be assured using the ultrasonic surface treatment technique.

Furthermore, there are situations in which the liquid crystal is used as a host for a dye which is the quest. The dye has molecules that will orient themselves with the host liquid crystal molecules. The ultrasonic surface treatment technique described herein is also suitable for use in guest-host type applications.

It will be appreciated that numerous changes and modifications can be made to the embodiment shown herein without departing from the spirit and scope of this invention.

What is claimed and desired to be secured by Letters Patent of the United States is:

1. A method of producing a liquid crystal display which exhibits a high contrast ratio and which includes a pair of substrate members and a liquid crystal film disposed therebetween, said method including treating the surface of the substrate intended to contact the liquid crystal film so as to form striations therein by:
    (a) immersing said substrate in a liquid;
    (b) ultrasonically cavitating the liquid so as to form a beam of cavitation bubbles;
    (c) directing the beam toward the substrate so that bubbles in the beam strike the substrate surface; and
    (d) moving said substrate in a direction at a predetermined speed so that the surface of the substrate is striated by the bubbles in the direction of movement.

2. A method as in claim 1, further including the steps of:
    (a) providing two surface treated substrates; and
    (b) providing a quantity of a liquid crystal material, and positioning said material between said substrates and in contact therewith so as to cause the molecules of said liquid crystal material to align themselves relative to said substrate.

3. The method of claim 2 for producing a liquid crystal device wherein the upper of said substrates and the lower of said substrates are aligned so as to provide homogenous parallel alignment.

4. The method of claim 2 for producing a liquid crystal device wherein the upper substrate is rotated relative to the lower substrate so as to cause a uniform angular twisting of said nematic liquid crystals.

5. The method of claim 3, wherein the upper substrate is rotated slightly less than 90° relative to the lower substrate and the liquid crystals are helically arranged between the upper and lower substrates.

* * * * *